July 23, 1963
M. TRESHOW
3,098,812
APPARATUS FOR CONTROL OF A BOILING REACTOR
RESPONSIVE TO STEAM DEMAND
Filed Aug. 14, 1961
2 Sheets-Sheet 1
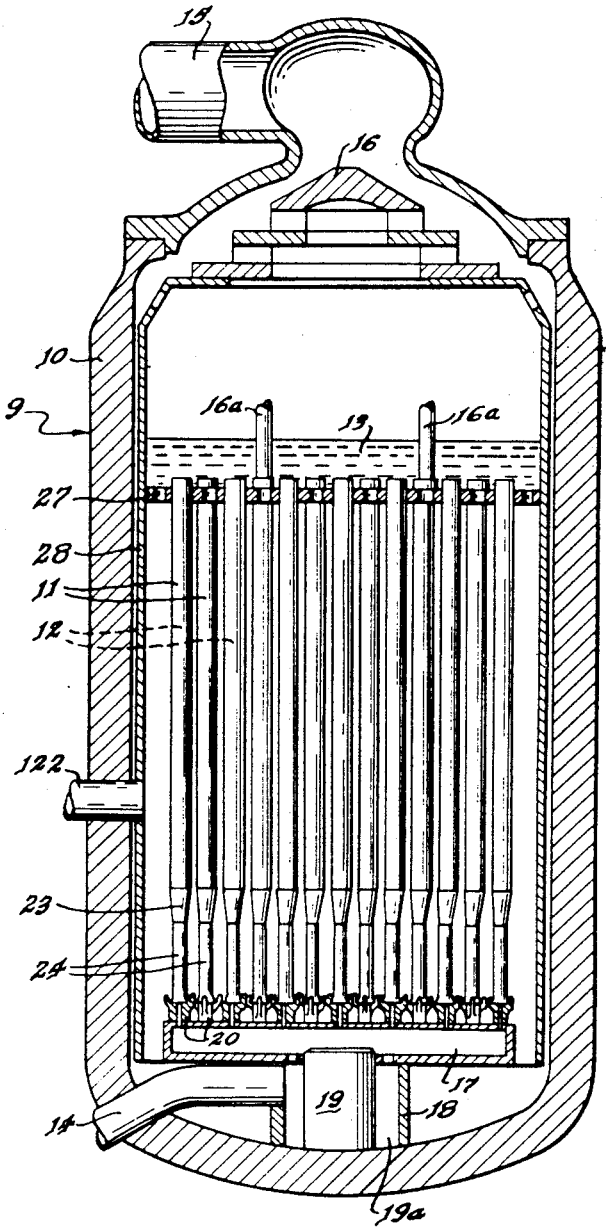
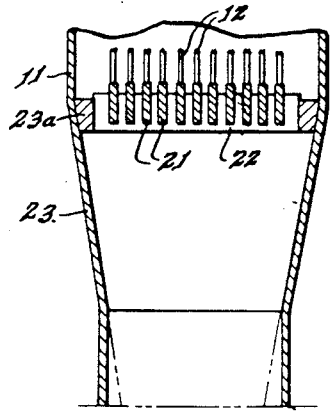
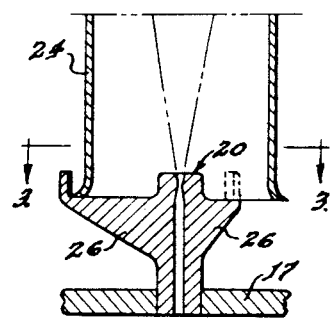
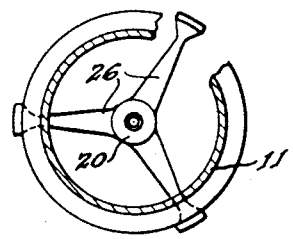
INVENTOR.
Michael Treshow
BY
Roland A. Anderson
Attorneys July 23, 1963
M. TRESHOW
3,098,812
APPARATUS FOR CONTROL OF A BOILING REACTOR
RESPONSIVE TO STEAM DEMAND
Filed Aug. 14, 1961
2 Sheets—Sheet 2
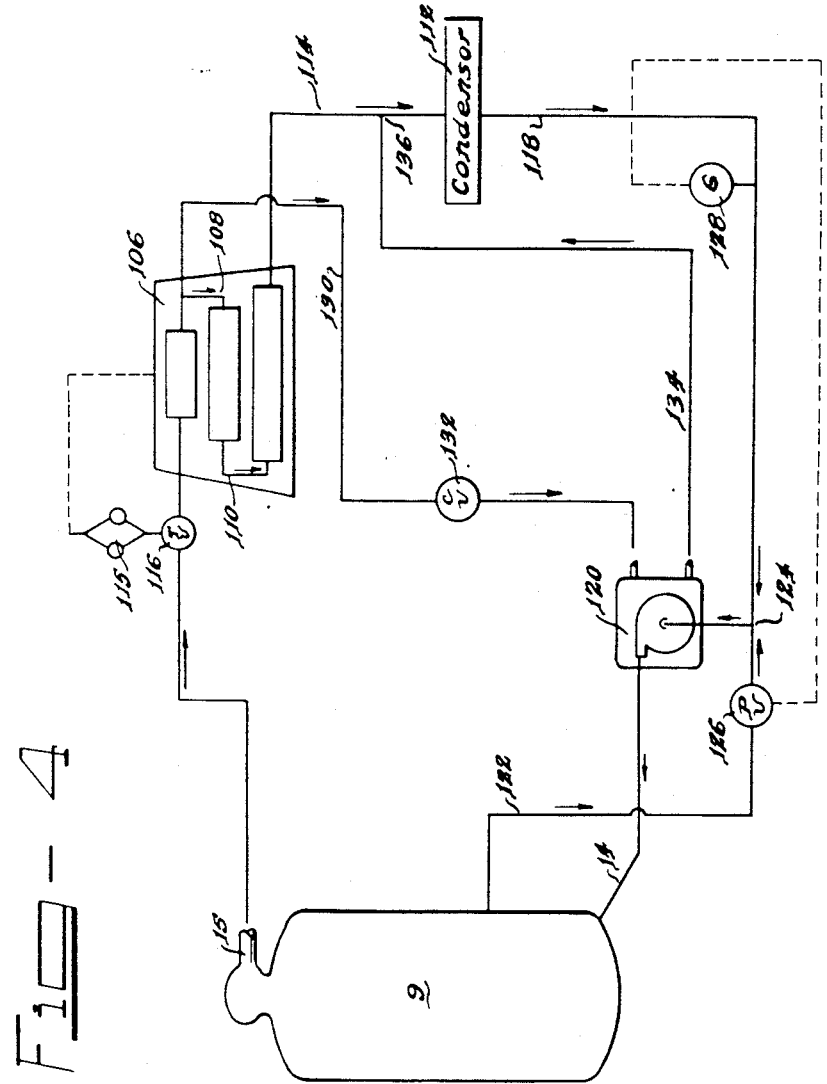

United States Patent Office 3,098,812
Patented July 23, 1963

1

3,098,812
APPARATUS FOR CONTROL OF A BOILING REACTOR RESPONSIVE TO STEAM DEMAND
Michael Treshow, Del Mar, Calif., assignor to the United States of America, as represented by the United States Atomic Energy Commission
Filed Aug. 14, 1961, Ser. No. 131,446
1 Claim. (Cl. 204—193.2)

This invention relates to a device to provide control of a boiling water nuclear reactor responsive to the steam demand of a turbine coupled to and operated by steam provided by the reactor.

At a given power production, a boiling water reactor is inherently self-controlling because the conversion of water to steam increases the moderator deficiency in the reactor and therewith the reactivity, since, because of the difference in density, steam is very much poorer in moderating ability than is water. Therefore, for a given power output, control is self-contained.

However, when the power demand changes, a boiling water reactor responds in the opposite direction than desired. As the turbine demand increases, pressure in the reactor drops because of the faster outflow of steam. This steam pressure drop causes the steam bubbles to expand, decreasing moderation and with it, the power level and steam generating ability. The reverse situation occurs when the turbine demand decreases.

The present invention overcomes this serious defect of the boiling water system, by operating a feed water pump with steam bled from an interstage point of the turbine. As steam demand increases, the steam pressure in the turbine increases, and the pumping speed increases. Faster water input increases the power level of the reactor by increasing the proportion of liquid water and the desired result is obtained.

In the drawings:

FIG. 1 is a sectional view of a nuclear reactor to which the present invention may be applied;

FIG. 2 is a detailed sectional view of an injection nozzle and the end of a fuel tube of the reactor to which the nozzle is applied;

FIG. 3 is a sectional view taken on the line 3—3 and showing the mounting of the fuel tube on the nozzle; and FIG. 4 is a diagrammatic view illustrating the use of the present invention with the reactor of FIGS. 1, 2, and 3.

As shown in FIGS. 1 and 2, a reactor 9 includes a pressure vessel 10, a plurality of tubes 11 in the vessel 10, fuel elements 12 in the tubes 11, a body 13 of moderator water contained in the vessel 10 and surrounding the tubes 11, an inlet pipe 14 for bringing feed water to the vessel 10, an outlet pipe 15 for steam generated in the vessel 10, and a baffle 16 for separating water from steam in the upper part of the vessel 10. It is contemplated that the feed water and the moderator water will be either heavy water or light water. Translatable control rods 16a are positioned to move in spaces between the fuel tubes 11.

The inlet pipe 14 is connected with a header 17 by means of a hollow member 18 which is secured to the base of the vessel 10 and supports the header 17. A central member 19 in the hollow member 18 cooperates therewith to provide an annular space 19a which properly distributes the flow of feed water from the inlet pipe 14 to the header 17.

Feed water is delivered from the header 17 through nozzles 20 which extend to or slightly into the lower ends of the tubes 11, a separate nozzle 20 being associated with each tube 11 in alignment therewith. Each nozzle 20 not only supplies feed water to the associated tube

2

11, but also causes a portion of the body 13 of moderator water directly outside the associated tube 11 to be sucked into the tube. Thus there is flow of moderator water along the outside of each tube 11, and the likelihood of boiling at the outside of the tube is minimized. Moreover, since only a portion of the water going through each tube 11 comes through the nozzles 20, pumping capacity needed to bring the feed water in through the inlet 14 is smaller than it would be if all the water going through the tubes 11 came through the nozzles 20.

In each tube 11 there is a plurality of the fuel elements 12, which are twisted ribbons held together in edge contact in the manner disclosed and claimed in the copending Breden et al. application Serial No. 475,319, filed December 14, 1954, now Patent No. 2,987,458, issued June 6, 1961. Each fuel element 12 has a corrosion-resistant jacket and a core containing atoms fissionable by neutrons of thermal energy. The fuel elements 12 are arranged in rows, and the lower end of each fuel element in a given row is attached to one of a plurality of strips 21 secured in slots in a support bar 22, which is carried by and within the lower end of the tube 11. The support bar 22 is carried by a ring 23a supported by a conical portion 23 of the tube 11 through engagement with the interior thereof.

The compositions, quantities, and dimensions of the pressure vessel 10, tubes 11, fuel elements 12, control elements 16a, body 13 of moderator water, and shielding will be as disclosed in FIGS. 16–25 and columns 14–21 of Untermyer Patent No. 2,936,273, dated May 10, 1960.

As shown in FIGS. 2 and 3, the lower end of each tube 11 gets lateral and vertical support on three arms 26 which are secured to the associated nozzle 20 and extend radially therefrom in spaced relation to one another. The upper portions of the tubes 11 get transverse support from a grid 27, through which the tubes extend. A thermal shield 28 is supported by means (not shown) in spaced relation to the interior cylindrical wall of the pressure vessel 10 and is connected to the baffle 16 so as to support the same.

The reactor of FIGS. 1–3 is shown and claimed in my copending application S.N. 659,193, filed May 14, 1957, now Patent No. 3,087,881. FIG. 4 illustrates the application of the present invention to that reactor.

Referring now to FIG. 4, steam leaves reactor 9 by outlet pipe 15 and passes therethrough to a multistage turbine 106. Partially exhausted steam passes between stages through lines 108 and 110 and to condenser 112 by way of line 114. Turbine 106 is maintained at a predetermined speed of rotation by a governor 115 acting on throttle valve 116.

Condensate leaves condenser 112 and passes through feed water pipe 118 to pump 120, which pumps the condensate into the reactor 9 through inlet pipe 14. When more water is needed to activate the nozzles 20, it is drawn from reactor 9 through outlet pipe 122 which joins the feed water pipe 118 at junction 124. Outlet pipe 122 is controlled by valve 126, which responds to the pressure signal from gauge 128, when a drop of pressure signals the need for additional water supply.

Pump 120 is operated by steam from an interstage location of turbine 106, in the present embodiment, between the first and second stages through supply line 130. The adjustment of the steam supply is made by means of control valve 132, manually operated. Exhaust steam from pump 120 returns to the condenser by exhaust line 134 by way of junction 136.

The pumping of water through the tubes 11 by means of the injection nozzles 20 increases the flow rate of the water through the tubes and thus the rated power of the reactor. Varying the pumping varies the rated power of the reactor 9. If the reactor does its own pumping, i.e., the flow of water through the tubes 11 depends on the difference between the density of the steam and water in the tubes and that of the water outside the tubes, the flow rate, and therefore the power, is automatically limited, since increase in flow rate depends on an increase in the amount of steam, which reduces the moderation and thus reactivity. Variation in water injection is achieved by variation of the speed of rotation of the pump 120. When the feed water supply is insufficent the needed water is drawn from the reactor 9 though pipe 122.

As the load on the steam turbine 106 increases, until the governor 115 acts on the throttle valve 116, the speed of revolution decreases. The governor 115 acts on the throttle valve 116, increasing the amount of steam admitted thereby increasing the pressure. In turn this increased pressure is found between the turbine stages. Since this steam bled off between stages powers the feed water pump 120 through line 130, more water is pumped to the nozzles 20 in the reactor 9, increasing the flow of water proportionately. This flow of course is augmented by the Venturi action of the nozzles 20 magnifying the increase of flow from the pump 120. The increased coolant water causes the steam void fraction in the fuel tubes 11 to decrease, increasing the moderator to fuel ratio. This increases the reactivity of the reactor 9 and with it the steam generation rate. A decrease in the power demand of the turbine 106 has a reverse action. Self-controlling of the system is thereby achieved.

The intention is to limit the invention only within the scope of the appended claim.

What is claimed is:

A boiling reactor-turbine system comprising a plurality of vertical tubes arranged side by side in parallel spaced relationship; a plurality of fuel elements containing fissionable material and being positioned in the tubes; a tank containing the tubes; means for injecting feed water in the lower end of each tube, the injecting means including nozzles located at the lower ends of the tubes in spaced relationship thereto for causing moderator water to be drawn thereinto along with feed water, there being an individual nozzle associated with each of the tubes for causing injection of feed water into the particular tube to draw moderator water along the exterior of the particular tube; means associated with a region of the tank above the tubes for separating water from the mixture of water and steam issuing from the top of the tubes and returning the water to the moderator around the tubes; a pump for supplying water to the nozzles; a multi-stage turbine operated by steam from said reactor; a condenser associated with said turbine; a feed water pipe communicating between said condenser and said pump; a pressure gauge connected to said feed water pipe; a reactor outlet pipe communicating between the reactor pressure vessel and a junction with the feed water pipe; a valve inserted into said reactor outlet pipe, responsive to the changes in pressure measured by said gauge; a throttle valve controlling steam flow to said turbine responsive to turbine speed; and a steam line from an interstage position of said turbine to said pump, whereby the pump is caused to operate at a speed proportional to the steam pressure at a between stage point of said turbine.

References Cited in the file of this patent
UNITED STATES PATENTS 2,936,273    Untermyer _____ May 10, 1960

FOREIGN PATENTS 434,710    Great Britain _____ Sept. 6, 1935
840,789    Great Britain _____ July 13, 1960

OTHER REFERENCES

Nucleonics, vol. 14, No. 4, April 1956, pp. 106 and 108.